United States Patent
Kobayashi et al.

(10) Patent No.: US 9,050,974 B2
(45) Date of Patent: Jun. 9, 2015

(54) DRIVE SYSTEM AND METHOD FOR CONTROLLING DRIVE SYSTEM

(75) Inventors: Tsunehiro Kobayashi, Saitama (JP); Mitsuhiro Iwadare, Saitama (JP); Satoshi Kodo, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/125,343

(22) PCT Filed: Feb. 23, 2012

(86) PCT No.: PCT/JP2012/054396
§ 371 (c)(1),
(2), (4) Date: Dec. 11, 2013

(87) PCT Pub. No.: WO2012/176494
PCT Pub. Date: Dec. 27, 2012

(65) Prior Publication Data
US 2014/0106929 A1 Apr. 17, 2014

(30) Foreign Application Priority Data
Jun. 23, 2011 (JP) ................. 2011-139797

(51) Int. Cl.
*B60W 20/00* (2006.01)
*F16H 29/04* (2006.01)
(Continued)

(52) U.S. Cl.
CPC ............. *B60W 20/40* (2013.01); *Y10T 477/26* (2015.01); *F16H 29/04* (2013.01); *B60K 6/48* (2013.01); *Y02T 10/6221* (2013.01); *B60K 6/543* (2013.01); *B60W 10/02* (2013.01); *Y10S 903/902* (2013.01)

(58) Field of Classification Search
CPC ..... B60W 10/02; B60W 10/10; B60W 20/40; F16H 29/04; Y10T 477/26; B60K 6/48; B60K 6/36; B60K 6/543; B60K 6/547

USPC ................. 477/5; 475/5; 74/329, 335, 665 A; 180/65.28, 65.285
See application file for complete search history.

(56) References Cited

U.S. PATENT DOCUMENTS 8,210,290 B2 * 7/2012 Simon et al. ............. 180/65.225
8,449,426 B2 * 5/2013 Nishimura ..................... 475/170
(Continued)

FOREIGN PATENT DOCUMENTS

JP     2000-230610 A    8/2000
JP     2007-126011 A    5/2007
(Continued)

OTHER PUBLICATIONS

International Search Report dated Apr. 24, 2012 corresponding to International Patent Application No. PCT/JP2012/054396 and English translation thereof.

*Primary Examiner* — Roger Pang
(74) *Attorney, Agent, or Firm* — Squire Patton Boggs (US) LLP

(57) ABSTRACT

Provided are a drive system and a method for controlling the drive system which reduce a shock to a third shaft at the start of an internal combustion engine during EV driving. The drive system includes an engine, a first shaft connected to a crankshaft, a second shaft, a first clutch, a motor generator, a third shaft, a first transmission, a one-way clutch, and an ECU for controlling a gear ratio of the first transmission and the first clutch. The first transmission includes a rotating ring, a rocking portion, and a rotation radius variation mechanism. If an angular velocity of the rocking portion is higher than or equal to a rotational speed of the third shaft, the one-way clutch transmits a power in only one direction of the rocking portion to the third shaft.

10 Claims, 12 Drawing Sheets

(51) Int. Cl.
*B60K 6/48* (2007.10)
*B60K 6/543* (2007.10)
*B60W 10/02* (2006.01)

(56) References Cited

U.S. PATENT DOCUMENTS 8,602,936 B2 * 12/2013 Ichikawa et al. ............. 475/170
8,641,571 B2 * 2/2014 Ichikawa et al. ............. 475/170
8,684,885 B2 * 4/2014 Ichikawa et al. ................. 477/6
8,757,306 B2 * 6/2014 Kobayashi et al. ...... 180/65.265
8,758,193 B2 * 6/2014 Ichikawa et al. .................. 477/5
2005/0039572 A1 * 2/2005 Friedmann ..................... 74/661
2007/0278022 A1 * 12/2007 Tanishima .................. 180/65.2
2010/0113211 A1 5/2010 Schneider et al.

FOREIGN PATENT DOCUMENTS

| | | |
|---|---|---|
| JP | 2008-105622 A | 5/2008 |
| JP | 2009-197981 A | 9/2009 |
| JP | 2010-25310 A | 2/2010 |
| JP | 2010-519470 A | 6/2010 |
| JP | 2010-265827 A | 11/2010 |

* cited by examiner

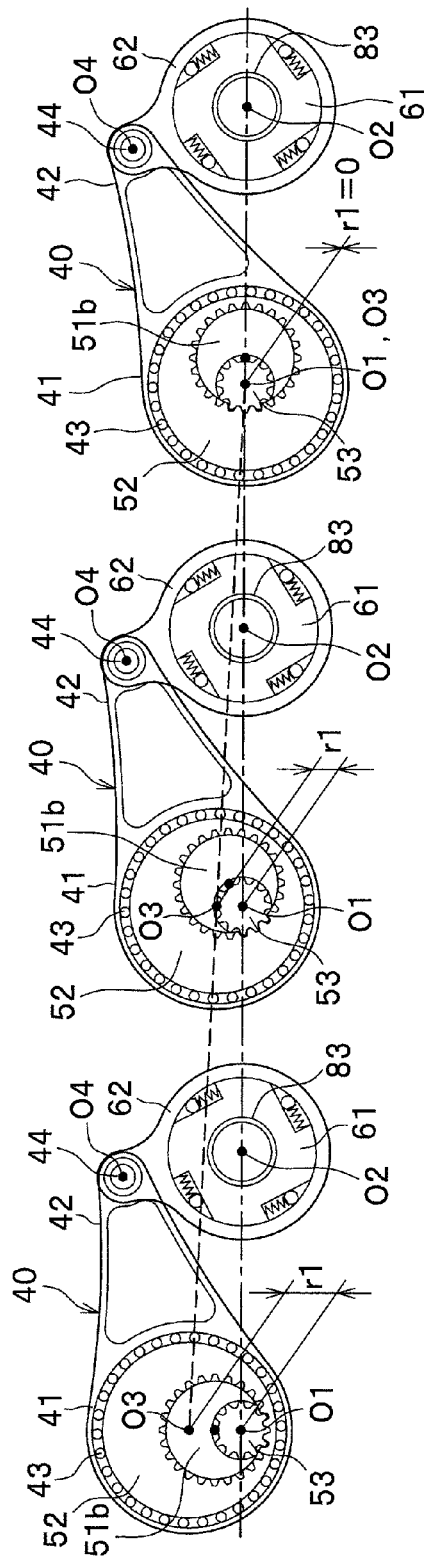

DRIVE SYSTEM AND METHOD FOR CONTROLLING DRIVE SYSTEM

CROSS REFERENCE TO RELATED APPLICATIONS

This application claims the foreign priority benefit under Title 35, United States Code, 119 (a)-(d) of Japanese Patent Application No. 2011-139797, filed on Jun. 23, 2011 in the Japan Patent Office, the disclosure of which is herein incorporated by reference in its entirety.

TECHNICAL FIELD

The present invention relates to a drive system and a method for controlling the drive system.

BACKGROUND ART

In recent years, various developments on a drive system (hybrid system) mounted on a hybrid vehicle have been advanced. For example, a system including a first clutch, a motor, a second clutch, and a transmission in this order toward a foot shaft (third shaft) from an engine (internal combustion engine) has been proposed (refer to Patent Document 1). Incidentally, the foot shaft is a shaft transmitting a power to driving wheels, for example, a shaft transmitting the power to differential gears.

Then, in such a system, during EV driving using the motor as a power source, cranking of the engine is performed by utilizing a torque of the motor, when the engine is started.

CITATION LIST

Patent Literature

{Patent Document 1}
Japanese Patent Application Publication No. 2010-265827

SUMMARY OF INVENTION

Technical Problem

However, if cranking of the engine is started by utilizing the torque of the motor during EV driving, there is a possibility that the torque to the foot shaft varies in accordance with the start of the engine, to cause a shock (vibration). Therefore, in Patent Document 1, in order to prevent the variation of the torque, reduction of the variation of the torque to the foot shaft is intended by changing the torque of the motor or by controlling ON (connected state)/OFF (disconnected state) of a second clutch disposed between the motor and the transmission finely, that is, in a short cycle. Therefore, the control at the start of the engine during EV driving has become complicated.

The object of the present invention is to provide a drive system and a method for controlling the drive system which reduce the shock to the third shaft such as the foot shaft at the start of the internal combustion engine during EV driving.

Solution to Problem

As means for solving the above problems, a drive system and a method for controlling the drive system according to the present invention are characterized in that the drive system includes an internal combustion engine, a first shaft connected to an output shaft of the internal combustion engine, a second shaft, a first connecting/disconnecting unit that connects or disconnects a power transmission between the first shaft and the second shaft, a motor generator that drives the second shaft, a third shaft that rotates integrally with drive wheels, a first transmission that shifts a power of the second shaft, a one-way clutch that transmits the power after shifted by the first transmission to the third shaft, and a control unit that controls a gear ratio of the first transmission and the first connecting/disconnecting unit, wherein the first transmission includes a rotating part that rotates by a rotary motion of the second shaft, a rocking portion that rocks by a rotary motion of the rotating part, and a rotation radius variation mechanism that varies an angular velocity of the rocking portion and varies the gear ratio by varying a rotation radius of the rotating part, wherein the one-way clutch transmits a power in only one direction of the rocking portion to the third shaft if the angular velocity of the rocking portion is more than or equal to a rotational speed of the third shaft, and wherein the control unit disconnects the first connecting/disconnecting unit during EV driving, and connects the first connecting/disconnecting unit when the internal combustion engine is started during EV driving.

According to this configuration, when a hybrid vehicle is during EV driving, i.e., when the motor generator operates as a motor, and a power of the motor generator is transmitted to the third shaft via the second shaft and the first transmission and rotates driving wheels, the power is not transmitted between the first shaft and the second shaft by disconnecting the first connecting/disconnecting unit by the control unit. Thus, the motor generator is able to drive the second shaft and the like without dragging the internal combustion engine, i.e., without receiving a resistance of the internal combustion engine in a stop state.

Further, when the internal combustion engine is started during EV driving, the control unit connects the first connecting/disconnecting unit, whereby the power of the motor generator is transmitted to the output shaft of the internal combustion engine via the second shaft, the first connecting/disconnecting unit, and the first shaft, and thus the output shaft is rotated. Since the output shaft is rotated in this manner (cranking of the engine is started in embodiments described later), in response to the rotation of the output shaft, it is possible to inject a fuel at an appropriate timing and start the internal combustion engine, that is, start a combustion cycle in the internal combustion engine.

In this case, associated with the start of the internal combustion engine, that is, associated with the start of the combustion cycle in the internal combustion engine, the power (torque) of the second shaft inputted into the first transmission is varied slightly. However, if the first transmission converts the rotary motion of the second shaft into a rocking motion, and the angular velocity of the rocking portion which rocks is more than or equal to the rotational speed of the third shaft, the one-way clutch is configured to transmit the power in only one direction of the rocking portion to the third shaft, thereby reducing the shock to the third shaft. In other words, since a variation in a region of less than an engagement torque of the one-way clutch (a torque locking the one-way clutch) is not transmitted to the third shaft from the second shaft, it is possible to reduce the shock to the third shaft.

Further, in the drive system, when the internal combustion engine is started during EV driving, the control unit preferably controls the gear ratio of the first transmission so that the angular velocity of the rocking portion is less than the rotational speed of the third shaft.

According to this configuration, when the internal combustion engine is started during EV driving, the control unit controls the gear ratio of the first transmission such that the angular velocity of the rocking portion is less than the rotational speed of the third shaft. Thus, the one-way clutch becomes in an unlocked state, and the power of the rocking portion is not transmitted to the third shaft. Therefore, the shock is not transmitted to the third shaft in association with the start of the engine.

Further, the drive system preferably includes a bypass route that transmits a power of the third shaft to the second shaft by bypassing the first transmission and the one-way clutch, and a second connecting/disconnecting unit that connects or disconnects a power transmission via the bypass route, wherein the control unit disconnects the second connecting/disconnecting unit during normal driving, and connects the second connecting/disconnecting unit during deceleration driving.

According to this configuration, since the control unit disconnects the second connecting/disconnecting unit during normal driving (during acceleration driving, during constant speed driving), the power of the third shaft is not transmitted to the second shaft via the bypass route.

On the other hand, during deceleration driving of the hybrid vehicle, since the control unit connects the second connecting/disconnecting unit, the power of the third shaft is transmitted to the second shaft via the bypass route. In this manner, the power of the third shaft is transmitted to the second shaft via the bypass route, and the second shaft is rotated, thereby making the motor generator function as a generator, generating regenerative electric power, and charging a power storage device such as a high voltage battery. As a result, it is possible to enhance fuel efficiency of the hybrid vehicle.

Further, if the control unit is configured to connect the first connecting/disconnecting unit during deceleration driving of the hybrid vehicle, the power of the third shaft is transmitted to the output shaft of the internal combustion engine via the bypass route, the second shaft, and the first shaft. Then, it is also possible to be decelerated by an engine brake of the internal combustion engine.

Further, the drive system preferably includes a second transmission that shifts a power transmitted via the bypass route.

According to this configuration, it is possible to shift by the second transmission the power transmitted via the bypass route. That is, during the deceleration driving of the hybrid vehicle, if the second connecting/disconnecting unit is in a connected state, by shifting the power transmitted via the bypass route by the second transmission, it is possible to shift the power inputted to the motor generator into the power having a high regenerative efficiency (generation efficiency of the regenerative electric power) in the motor generator.

Further, if the control unit is configured to connect the first connecting/disconnecting unit during deceleration driving of the hybrid vehicle, by shifting the power transmitted via the bypass route by the second transmission, it is possible to vary the power inputted to the internal combustion engine, thereby varying the strength of the engine brake.

Advantageous Effects of Invention

According to the present invention, it is possible to provide a drive system and a method for controlling the drive system which reduce the shock to the third shaft such as the foot shaft at the start of the internal combustion engine during EV driving. Further, aspects of the present invention as well as the effects and features thereof will be more apparent by detailed descriptions of exemplary and non-limited embodiments of the present invention described later with reference to the accompanying drawings.

BRIEF DESCRIPTION OF DRAWINGS

FIG. 4A is a side view of the one-way clutch and the first transmission according to the embodiment of the present invention, and shows a state in which a rotation radius r1 (eccentricity) is maximum and a first gear ratio i1 is small.

FIG. 4B is a side view of the one-way clutch and the first transmission according to the embodiment of the present invention, and shows a state in which the rotation radius r1 is medium and the first gear ratio i1 is medium.

FIG. 4C is a side view of the one-way clutch and the first transmission according to the embodiment of the present invention, and shows a state in which the rotation radius r1 is zero and the first gear ratio i1 is ∞ (infinity).

DESCRIPTION OF EMBODIMENTS

Hereinafter, an embodiment of the present invention will be described with reference to FIGS. 1 to 11.

<Configuration of Drive System>

Figure 1:
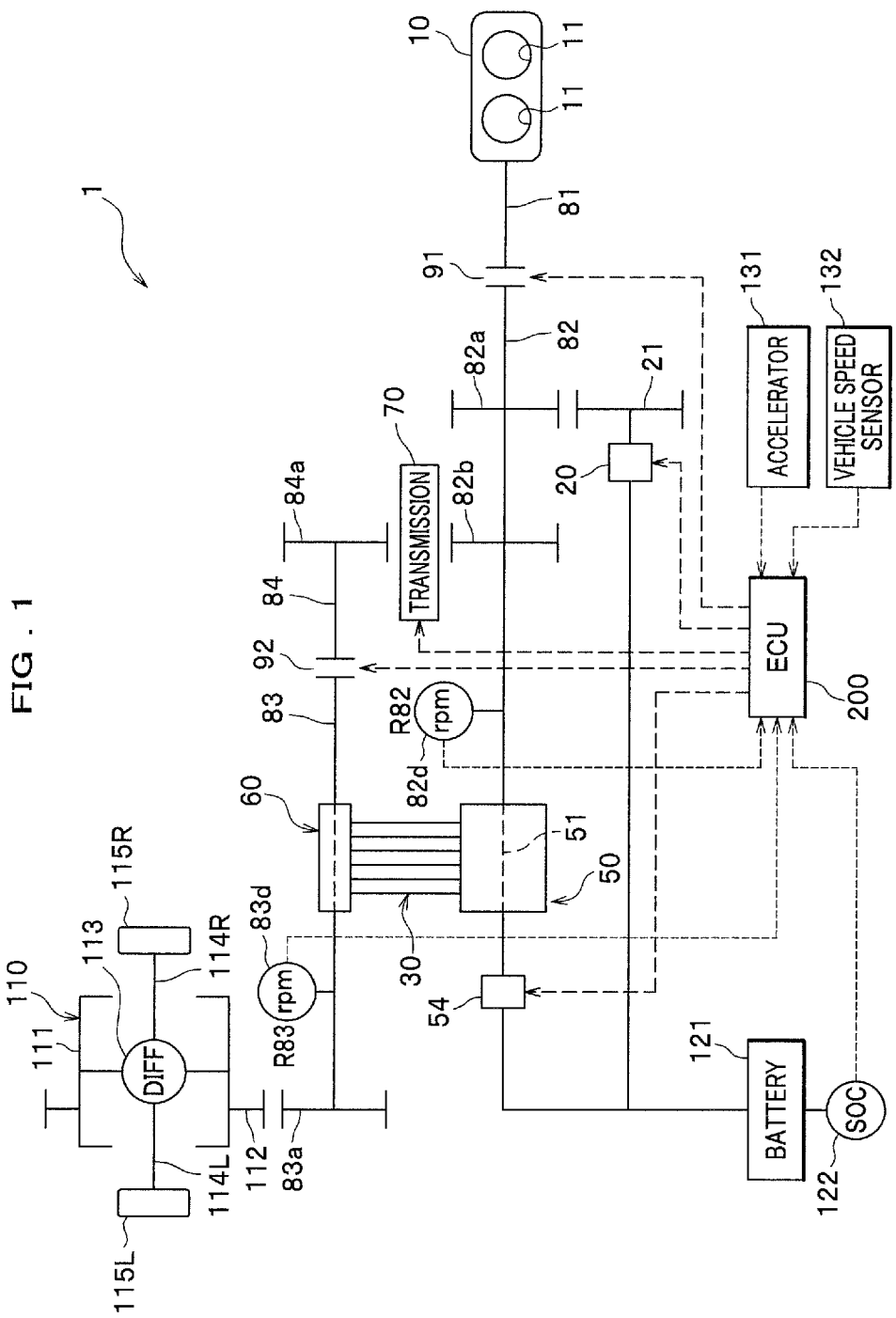
FIG. 1 is a block diagram of a drive system according to an embodiment of the present invention.

A drive system 1 according to the present embodiment shown in FIG. 1 is mounted on an unillustrated hybrid vehicle, and is a system generating a driving force of the hybrid vehicle. Note that, the hybrid vehicle may be a motorcycle or a three-wheeled vehicle, in addition to a four-wheeled vehicle.

The drive system 1 includes an engine 10 (internal combustion engine), a motor generator 20, a first transmission 30, a plurality of (six in this case) one-way clutches 60, a second transmission 70, a first shaft 81, a second shaft 82, a third shaft 83 (foot shaft), a fourth shaft 84, a first clutch 91 (first connecting/disconnecting unit), a second clutch 92 (second connecting/disconnecting unit), differential gears 110, a battery 121 (power storage device), and an ECU 200 (Electronic Control Unit) controlling the system electronically. Note that, in the following descriptions, "forward direction" is a direction corresponding to the forward direction of the hybrid vehicle, and "reverse direction" is a direction corresponding to the backward direction of the hybrid vehicle.

<Engine>

In the present embodiment, the engine 10 is a reciprocating engine configured with in-line two-cylinder type having two cylinders 11, 11 in a cylinder block (not shown). However, the number and arrangement of the cylinders are not limited thereto, and can be modified freely as appropriate.

The engine 10 is adapted to burn a fuel (gasoline) and operate in four cycles (intake, compression, combustion, exhaust) according to instructions from the ECU 200. That is, the engine 10 is attached with a fuel injector for injecting the fuel, a throttle valve for controlling a flow rate of an intake air, an ignition plug for igniting the fuel (not shown neither), and the like, and the ECU 200 is adapted to control an operation (a combustion cycle) of the engine 10 by electronically controlling these.

<First Shaft>

The first shaft 81 is connected to an unillustrated crankshaft (output shaft) of the engine 10. Further, the first shaft 81 is adapted to rotate integrally with the crankshaft.

<Second Shaft, First Clutch>

The second shaft 82 is connected to the first shaft 81 via the first clutch 91. Further, a gear 82a and a gear 82b are secured to the second shaft 82.

The first clutch 91 is intended to connect/disconnect a power transmission between the first shaft 81 and the second shaft 82 according to the instructions from the ECU 200. That is, the first clutch 91 is intended to turn ON (connected state)/OFF (disconnected state) the power transmission. As the first clutch 91, for example, an electromagnetic clutch can be used. The same is true for the second clutch 92.

Further, a rotational speed sensor 82d is attached to the second shaft 82. The rotational speed sensor 82d is adapted to detect a rotational speed R82 (rpm) of the second shaft 82 and output it to the ECU 200.

<Motor Generator>

The motor generator 20 is adapted to function as a motor (electric motor) or a generator (electric generator) according to the instructions from the ECU 200. A gear 21 is secured to the output shaft of the motor generator 20, and the gear 21 is meshed with the gear 82a. The motor generator 20 is connected with the battery 121, and is adapted to transfer the power between the battery 121 and the motor generator 20.

In other words, when functioning as the motor, the motor generator 20 is adapted to rotate (be driven) using the battery 121 as a power source and rotate (drive) the second shaft 82. On the other hand, when functioning as the generator, the motor generator 20 is adapted to generate power by a rotational force of the second shaft 82, and the generated power is adapted to be charged to the battery 121.

<First Transmission>

Figure 2:
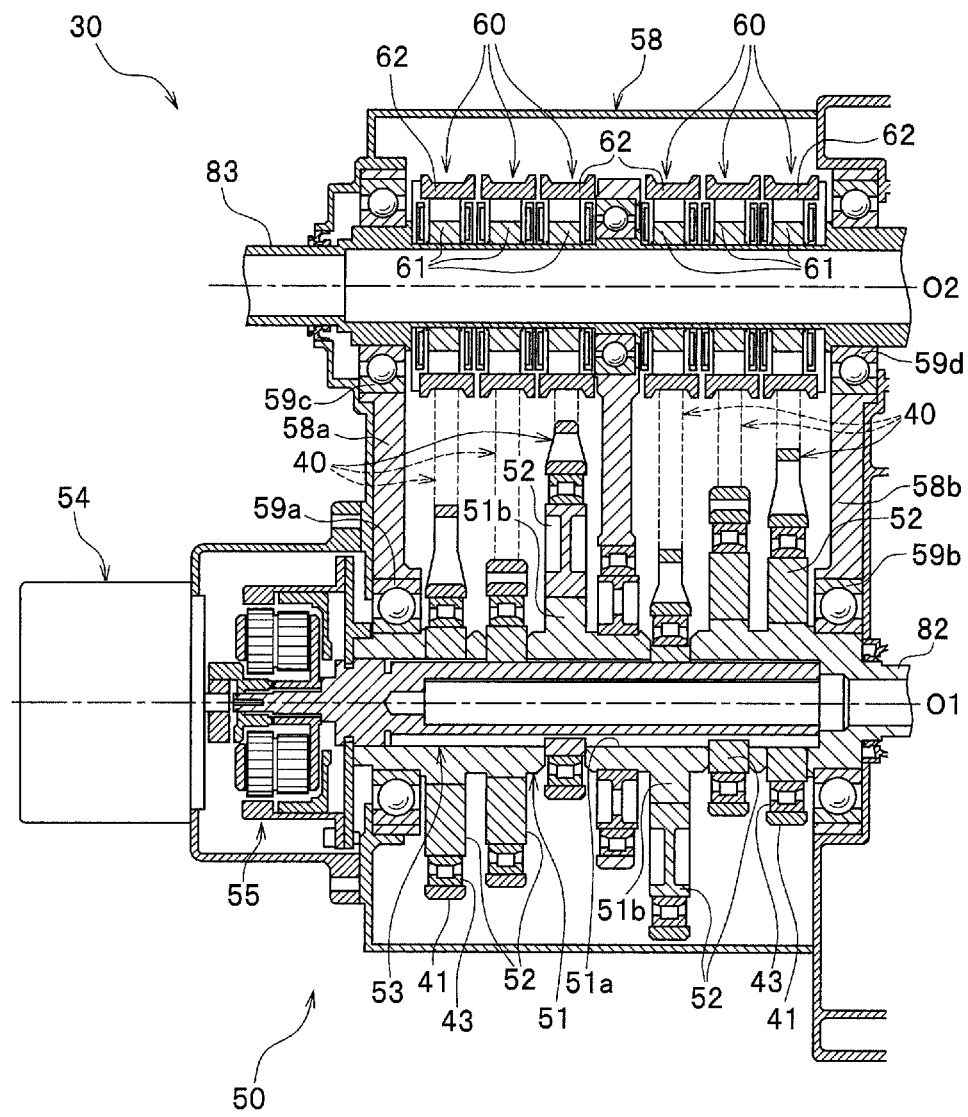
FIG. 2 is a cross-sectional view of a one-way clutch and a first transmission according to the embodiment of the present invention.
Figure 3:
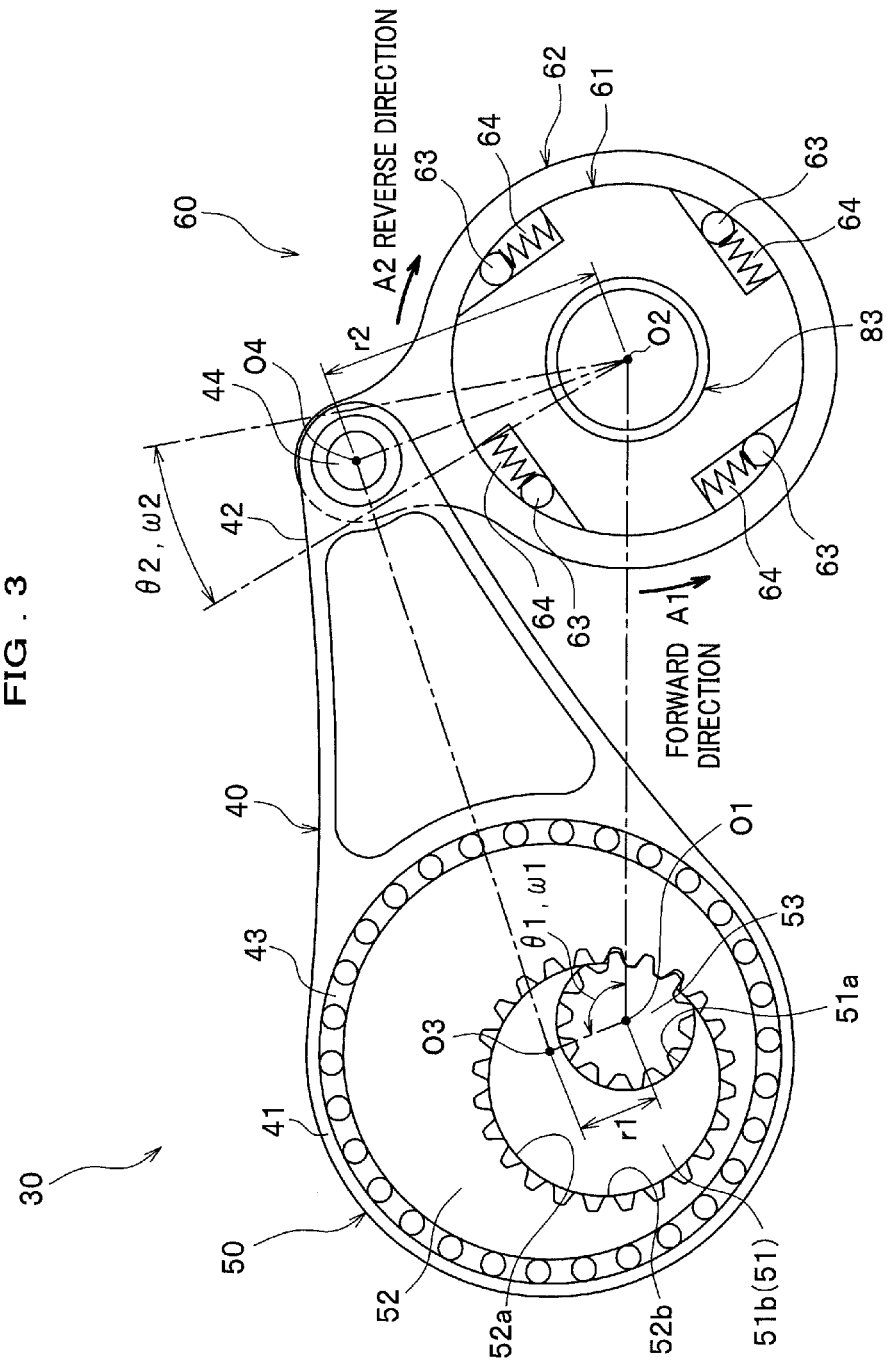
FIG. 3 is a side view of the one-way clutch and the first transmission according to the embodiment of the present invention.
Figure 5A:
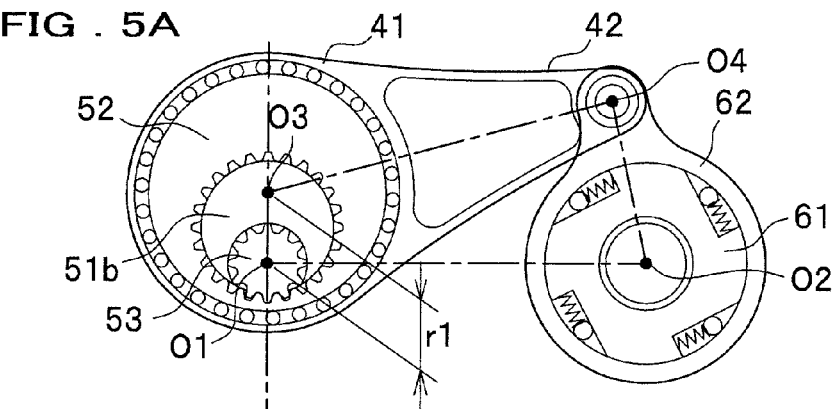
FIGS. 5A to 5D are side views of the one-way clutch and the first transmission, and show a rocking motion and a rotary motion in a state where the rotation radius r1 is maximum and the first gear ratio i1 is small.
Figure 5B:
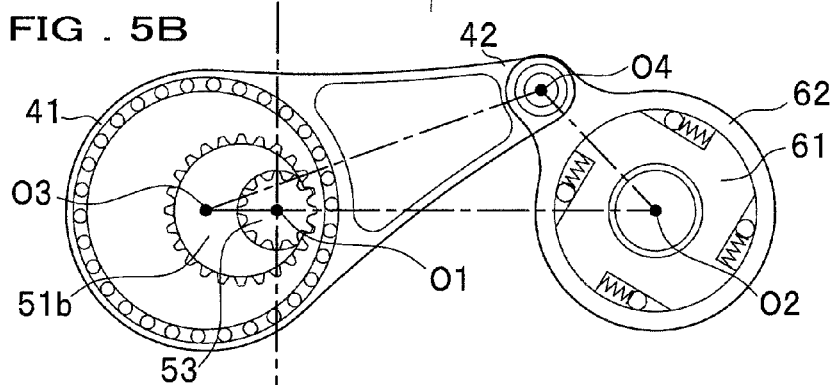
Figure 5C:
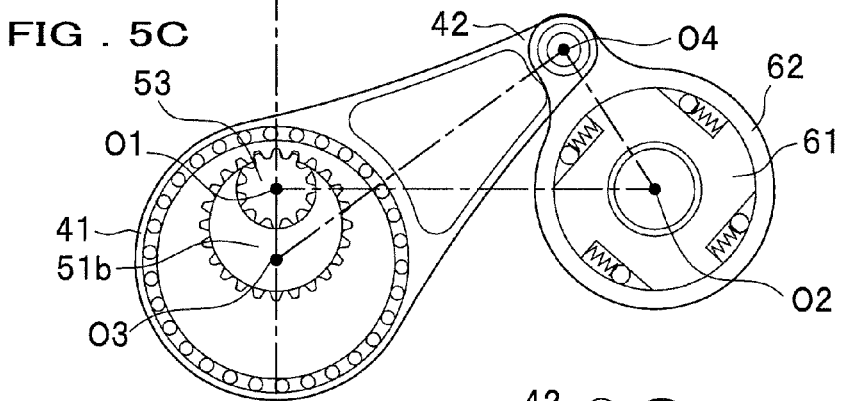
Figure 5D:
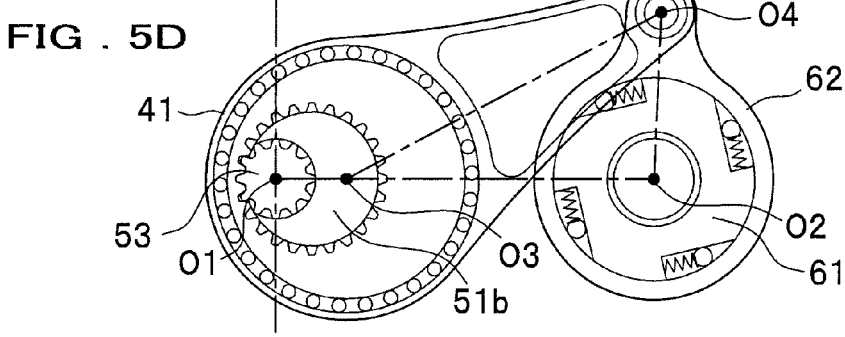
Figure 6A:
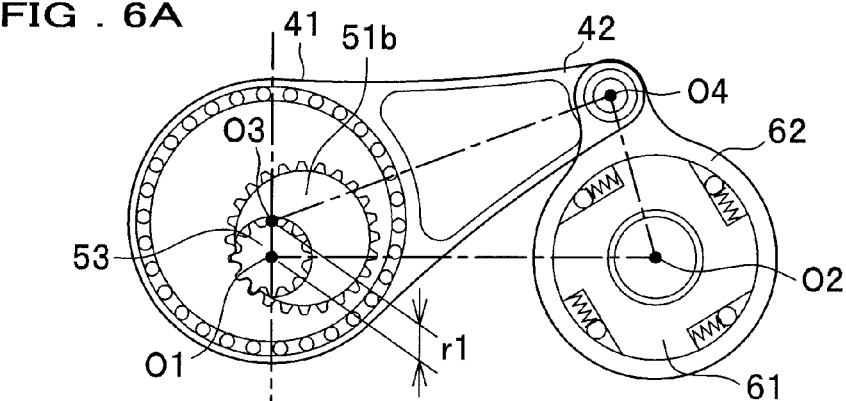
FIGS. 6A to 6D are side views of the one-way clutch and the first transmission, and show a rocking motion and a rotary motion in a state where the rotation radius r1 is medium and the first gear ratio i1 is medium.
Figure 6B:
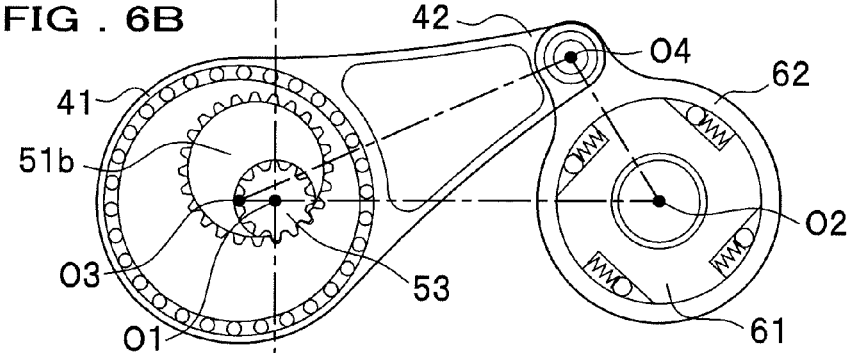
Figure 6C:
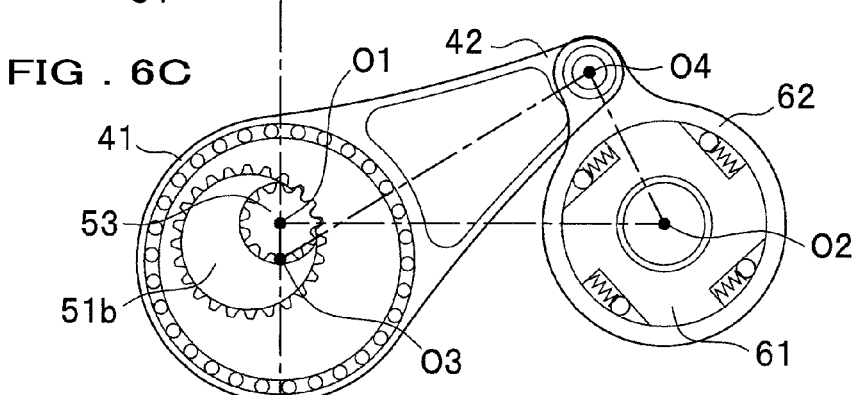
Figure 6D:
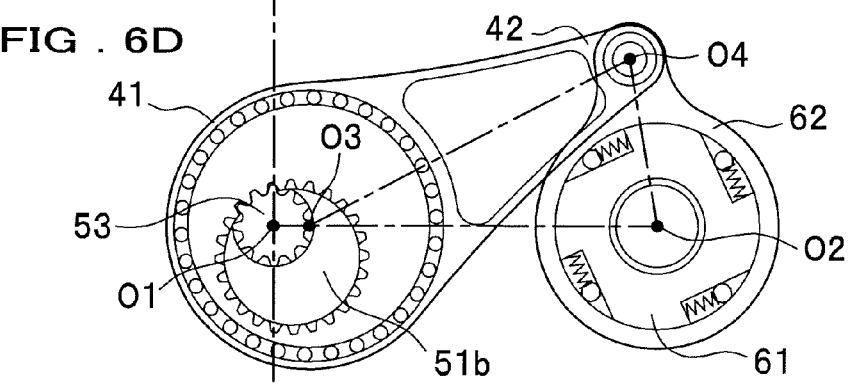
Figure 7A:
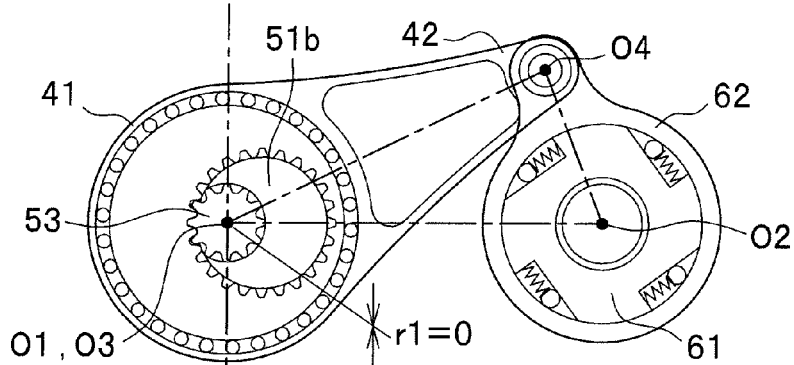
FIGS. 7A to 7D are side views of the one-way clutch and the first transmission, and show a rocking motion and a rotary motion in a state where the rotation radius r1 is zero and the first gear ratio i1 is ∞ (infinity).
Figure 7B:
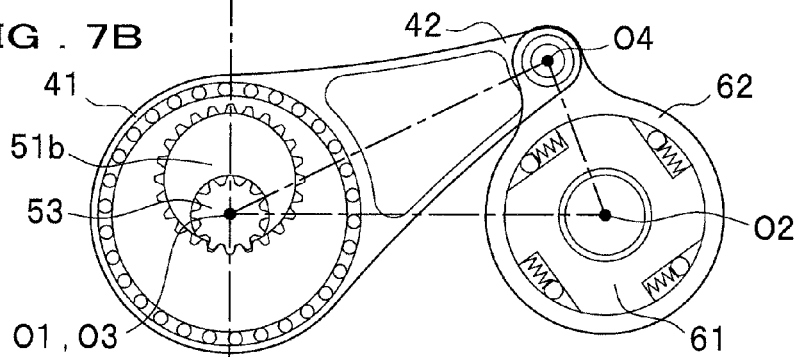
Figure 7C:
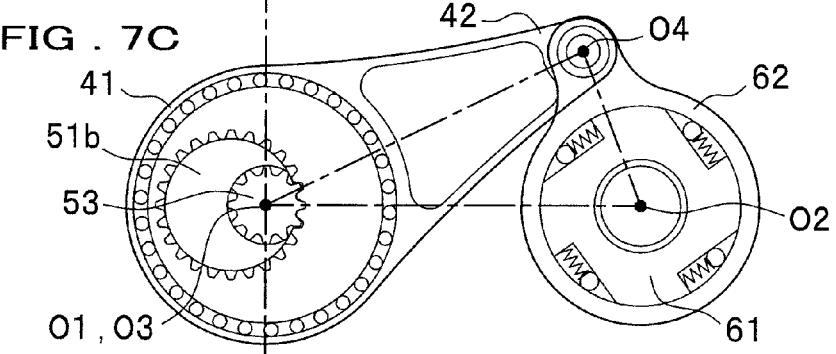
Figure 7D:
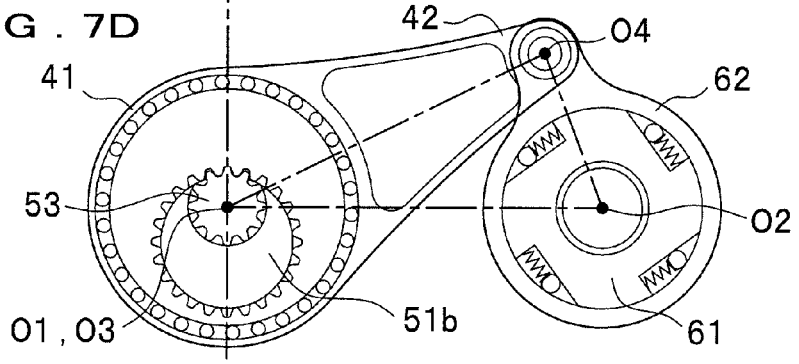

As shown in FIGS. 1 to 3, the first transmission 30 is a transmission of four-node crank mechanism which shifts the rotational force (power) of the second shaft 82 according to the instruction from the ECU 200. That is, the first transmission 30 is a mechanism which converts the rotary motion of the second shaft 82 to a rocking motion, transmits the rocking motion to the one-way clutch 60, and shifts a first gear ratio i1 infinitely continuously variable, whereby an angular velocity ω2 (rocking speed) and a rocking angle θ2 (rocking amplitude) of a rocking portion 42 described later can be variable (see FIG. 3). Note that, "the first gear ratio i1=the rotational speed of the second shaft 82/the rotational speed of the third shaft 83", and in this case, "the rotational speed of the third shaft 83" is "the rotational speed of the third shaft 83 when rotating only by a forward rocking motion (power) of an outer ring 62".

As shown in FIGS. 2 and 3, the first transmission 30 includes a plurality of (six in this case) rocking conversion rods 40 (rocking conversion units) which converts the rotary motion of the second shaft 82 to the rocking motion, and a rotation radius variation mechanism 50 which varies the rocking angle θ2 (rocking amplitude) and the angular velocity ω2 (rocking speed) of the rocking portion 42 of each rocking conversion rod 40 by varying continuously variable a rotation radius r1 of a rotation ring 41 (rotation portion) of each rocking conversion rod 40.

Here, the rotation radius r1 is a distance between a center axis O1 of an input shaft 51 (the second shaft 82) and a first fulcrum O3 which is a center of a disk 52. Incidentally, a rocking center of the rocking portion 42 is a center axis O2 of the third shaft 83 and is fixed, and a rocking radius r2 (distance between the center axis O2 and a second fulcrum O4) is also fixed. Note that, the number of the rocking conversion rods 40, eccentric portions 51b, the disks 52, and the like can be changed freely.

<First Transmission—Rotation Radius Variation Mechanism>

The rotation radius variation mechanism 50 includes the input shaft 51 which is connected to the second shaft 82 and inputted with the power of the second shaft 82, six disks 52, a pinion 53 which varies the rotation radius r1 (eccentric radius, eccentricity) by rotating relatively the input shaft 51 and the disks 52, a DC motor 54 which rotates the pinion 53, and a deceleration mechanism 55.

The input shaft 51 is rotatably supported via bearings 59a, 59b by wall portions 58a, 58b constituting a transmission case 58. Note that, the center axis O1 of the input shaft 51 coincides with the rotation axis of the second shaft 82 (see FIG. 2).

In FIG. 2, the input shaft 51 has a right end side (one end side) thereof connected to the second shaft 82. The input shaft 51 is adapted to rotate at an angular velocity ω1 integrally with the second shaft 82.

Further, the input shaft 51 has, on the center axis O1 thereof, a hollow portion 51a in which the pinion 53 is rotatably inserted. Note that, the hollow portion 51a partially opens radially outward, and the pinion 53 is adapted to mesh with an inner gear 52b (see FIG. 3).

Further, the input shaft 51 has six eccentric portions 51b of substantially circular (substantially crescent) viewed in an axial direction that is deviated by a constant eccentric distance with respect to the center axis O1 (see FIG. 2). In the present embodiment, the six eccentric portions 51b are disposed at equal intervals in the axial direction of the input shaft 51 (see FIG. 2), and disposed at equal intervals (60° intervals) in the circumferential direction. Thus, phases of the rocking motions of the six outer rings 62 of the six one-way clutches 60 described later are shifted by equal intervals (60° intervals) (see FIG. 9). As a result, the power in the forward direction of the rocking motions of the six outer rings 62 is transmitted continuously to an inner ring 61 from the six outer rings 62 rocking with shifted phases.

The six disks 52 are respectively provided on the six eccentric portions 51b (see FIG. 2). To describe further, as shown in FIG. 3, each disk 52 exhibits a circular shape. Then, in a position deviated from the first fulcrum O3 which is the center of the disk 52, a circular eccentric bore 52a is formed, and the eccentric portion 51b is rotatably fitted into the eccentric bore 52a. Further, the inner gear 52b is formed on the inner peripheral surface of the eccentric bore 52a, and is meshed with the pinion 53.

The pinion 53 has a function (1) for locking (holding a relative position) the eccentric portion 51b and the disk 52, and holding the rotation radius r1, and a function (2) for rotating relatively the eccentric portion 51b and the disk 52, and varying the rotation radius r1.

In other words, if the pinion 53 rotates in synchronization with the eccentric portion 51b (input shaft 51, second shaft 82), i.e., if the pinion 53 rotates at the same rotational speed with the eccentric portion 51b (input shaft 51, second shaft 82), the relative position between the eccentric portion 51b and the disk 52 is held, i.e., the eccentric portion 51b and the disk 52 rotate integrally, and the rotation radius r1 is adapted to be held.

On the other hand, if the pinion 53 rotates at the rotational speed different from (higher than/ lower than) that of the eccentric portion 51b, the disk 52 meshed with the pinion 53 at the inner gear 52b thereof rotates relatively around the eccentric portion 51b, and as a result, the rotation radius r1 is adapted to be variable.

The DC motor 54 is adapted to rotate according to the instruction from the ECU 200, and rotate the pinion 53 at an appropriate rotational speed. The output shaft of the DC motor 54 is connected to the pinion 53 via the deceleration mechanism 55 (planetary gear mechanism), and the output of the DC motor 54 is adapted to be decelerated to approximately 120:1 and inputted to the pinion 53.

<First Transmission—Rocking Conversion Rod>

As shown in FIG. 3, the rocking conversion rod 40 is integrated with the rotation ring 41 to which the rotary motion of the input shaft 51 is inputted, and includes the rocking portion 42 which outputs a rocking motion thereof to the one-way clutch 60, and a bearing 43.

The rotation ring 41 is provided so as to be fitted onto the disk 52 via the bearing 43. The rocking portion 42 is rotatably connected to the outer ring 62 of the one-way clutch 60 via a pin 44.

Thus, the rotation ring 41 and the disk 52 are relatively rotatable. Therefore, the rotation ring 41 rotates in synchronization with the disk 52 which rotates at the rotation radius r1 about the center axis O1, but the rotation ring 41 rotates relative to the disk 52, whereby the rocking conversion rod 40 itself does not rotate, and substantially holds its posture. When the rotation ring 41 makes one rotation, regardless of the size of the rotation radius r1, the rocking portion 42 is adapted to make one reciprocating rocking motion in an arc shape, and the outer ring 62 is also adapted to make one reciprocating rocking motion in an arc shape.

<One-way Clutch, Third Shaft>

Each one-way clutch 60 is adapted to transmit to the third shaft 83 the power in only forward direction of the rocking portion 42 of each rocking conversion rod 40.

As shown in FIG. 2, the third shaft 83 is rotatable about the center axis O2 and supported via the bearings 59c, 59d by the wall portions 58a, 58b constituting the transmission case 58.

As shown in FIG. 3, each one-way clutch 60 includes the inner ring 61 (clutch inner) which is integrally fixed to the outer peripheral surface of the third shaft 83 and rotates integrally with the third shaft 83, the outer ring 62 (clutch outer) which is provided so as to be inserted onto the inner ring 61, rollers 63 which are provided in plurality in the circumferential direction between the inner ring 61 and the outer ring 62, and coil springs 64 (urging members) which urge each of the rollers 63.

The outer ring 62 is rotatably connected to the rocking portion 42 of the rocking conversion rod 40 via the pin 44, and makes the rocking motion in forward (refer to an arrow A1 in FIG. 3)/backward (refer to an arrow A2 in FIG. 3) direction in conjunction with the rocking motion of the rocking portion 42.

The rollers 63 are adapted to put the inner ring 61 and the outer ring 62 in a locked state/unlock state with each other, and each of the coil springs 64 urge the rollers 63 in a direction to be in the locked state.

Figure 9:
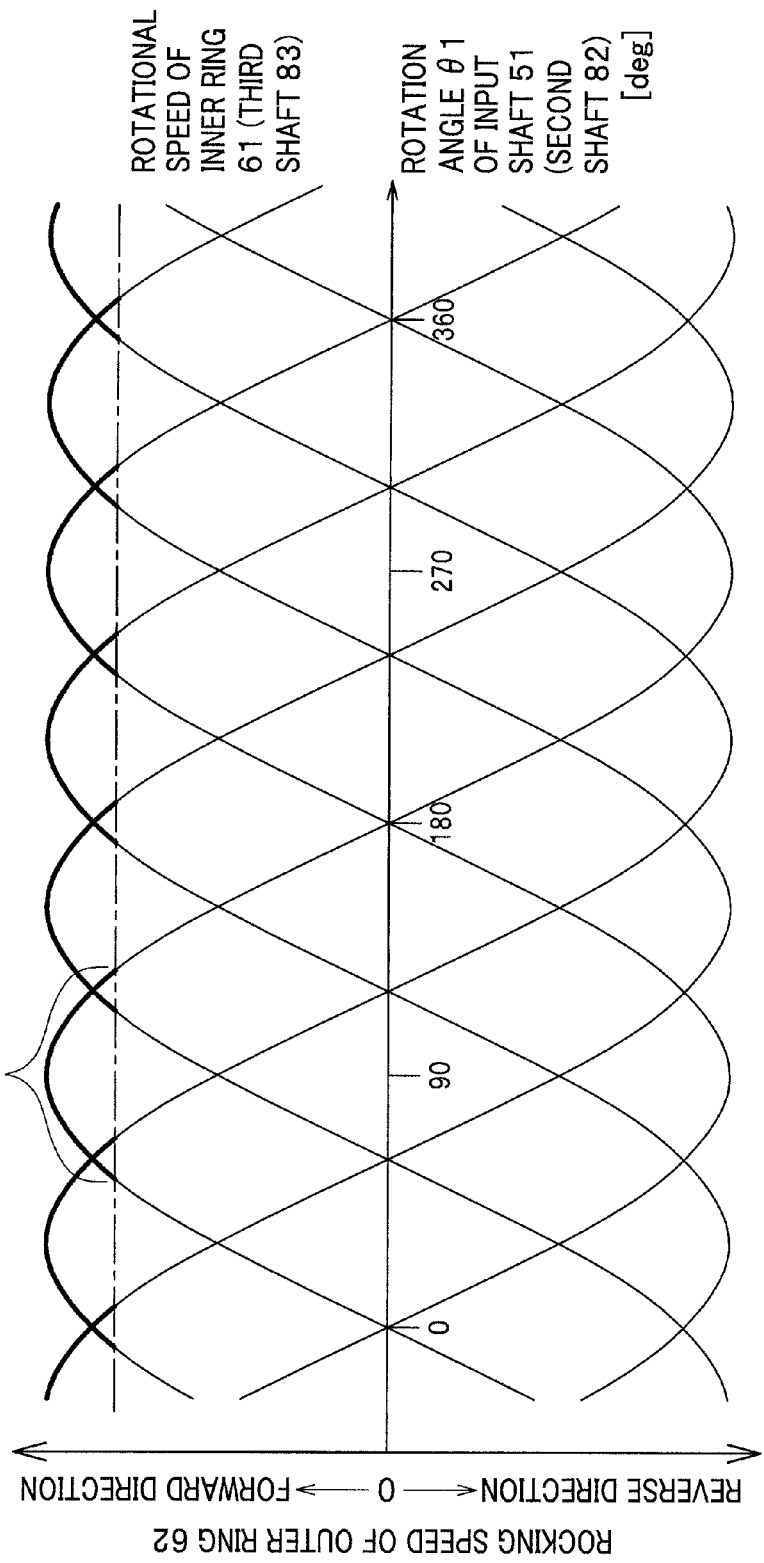
FIG. 9 is a graph showing a relationship between the rotation angle $\theta 1$ of the input shaft (second shaft) and a rocking speed of the outer ring (rocking portion).

As shown in FIG. 9, if a forward rocking speed of the outer ring 62 exceeds a forward rotational speed of the inner ring 61 (third shaft 83), the inner ring 61 and the outer ring 62 become in the locked state (power transmission state) by the roller 63. Then, the forward power of the rocking portion 42 of the rocking conversion rod 40 is transmitted via the one-way clutch 60 to the third shaft 83, so that the third shaft 83 rotates in the forward direction.

In FIG. 9, a state in which the power is transmitted to the inner ring 61 from the outer ring 62 is shown by thick lines.

<Variable Situation of Rotation Radius r1>

Here, the situation in which the rotation radius r1 varies will be described with reference to FIGS. 4A to 4C, and then, the rocking motion of the rocking portion 42 and the rotary motions of the disk 52 (rotation ring 41) at the different rotation radiuses r1 will be described with reference to FIGS. 5A to 7D.

As shown in FIG. 4A, when the first fulcrum O3 (center of the disk 52) and the center axis O1 are farthest apart from each other, the rotation radius r1 becomes "maximum". As shown in FIG. 4B, when the pinion 53 rotates at a rotational speed different from that of the eccentric portion 51b, and the eccentric portion 51b and the disk 52 rotate relative to each other, the first fulcrum O3 and the center axis O1 become close with each other, and the rotation radius r1 becomes "medium". Further, as shown in FIG. 4C, when the eccentric portion 51b and the disk 52 rotate relative to each other, the first fulcrum O3 and the center axis O1 overlap with each other, and the rotation radius r1 becomes "zero". In this manner, the rotation radius r1 is controllable continuously variable between "maximum" and "zero".

Next, in a state where the rotation radius r1 is "maximum" as shown in FIG. 4A, when the eccentric portion 51b and the pinion 53 rotate synchronously, the eccentric portion 51b, the disk 52, and the pinion 53 are adapted to rotate integrally while holding the rotation radius r1 "maximum" as shown in FIGS. 5A to 5D.

Figure 8:
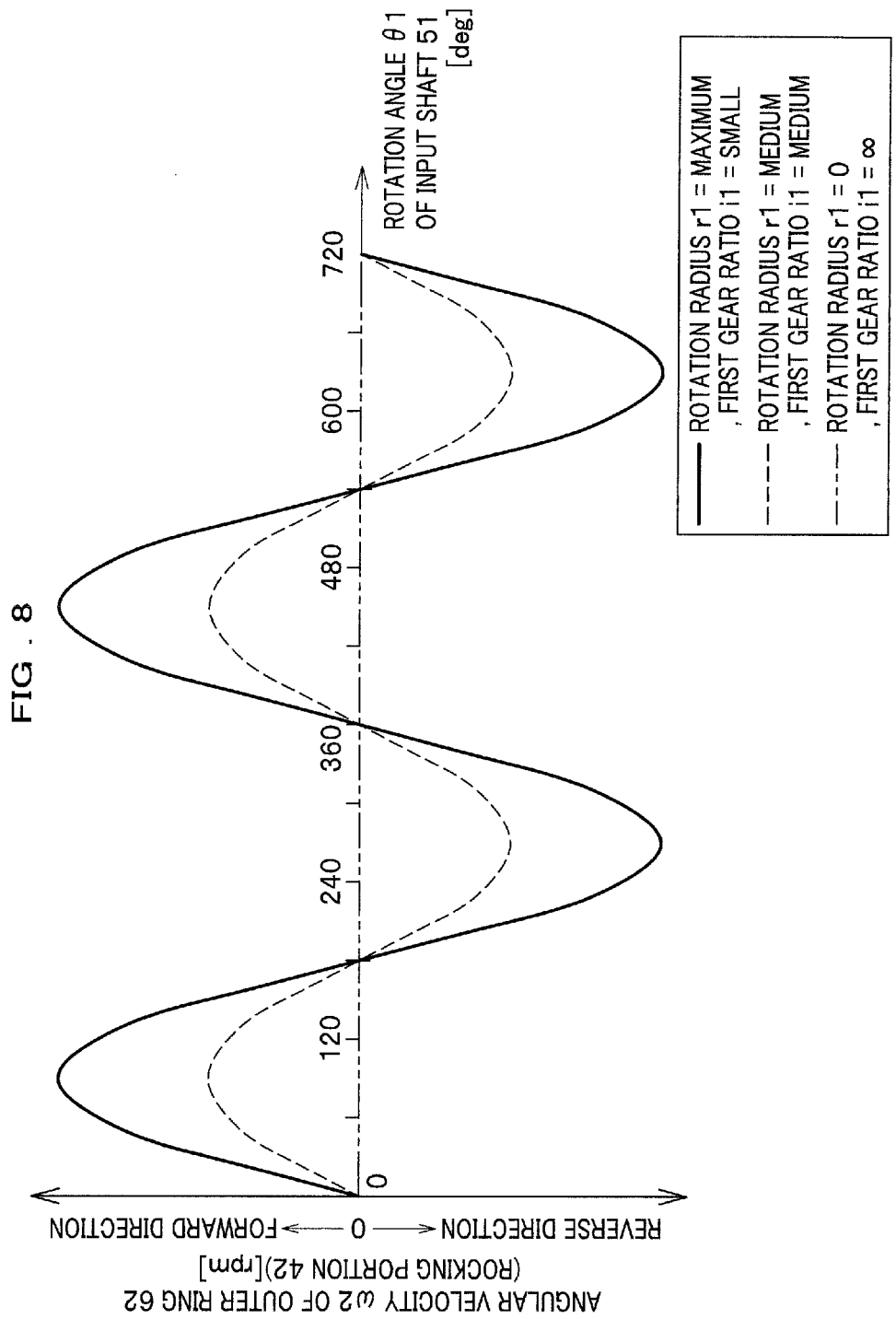
FIG. 8 is a graph showing a relationship between a rotation angle $\theta 1$ of an input shaft (second shaft) and an angular velocity $\omega 2$ of an outer ring (a rocking portion).

In this case, the amplitude of the rocking angle θ2 and the angular velocity ω2 of the rocking portion 42 (outer ring 62) become "maximum" (see FIG. 8). Further, "the first gear ratio i1=the rotational speed of the input shaft 51 (second shaft 82)/the rotational speed of the third shaft 83", and "the rocking speed of the outer ring 62=the radius (fixed value) of the outer ring 62×the angular velocity ω2", whereby the first gear ratio i1 becomes "small".

Next, in a state where the rotation radius r1 is "medium" as shown in FIG. 4B, when the eccentric portion 51b and the pinion 53 rotate synchronously, the eccentric portion 51b, the disk 52, and the pinion 53 are adapted to rotate integrally while holding the rotation radius r1 "medium" as shown in FIGS. 6A to 6D. In this case, the amplitude of the rocking angle θ2 and the angular velocity ω2 of the rocking portion 42 (outer ring 62) become "medium" (see FIG. 8). Then, the first gear ratio i1 becomes "medium".

Next, in a state where the rotation radius r1 is "zero" as shown in FIG. 4C, when the eccentric portion 51b and the pinion 53 rotate synchronously, the eccentric portion 51b, the disk 52, and the pinion 53 are adapted to rotate integrally while holding the rotation radius r1 "zero" as shown in FIGS. 7A to 7D. In other words, the eccentric portion 51b, the disk 52, and the pinion 53 run idle in the rotation ring 41, and the rocking conversion rod 40 does not operate. In this case, the rocking angle θ2 and the angular velocity ω2 of the rocking portion 42 (outer ring 62) become "zero" (see FIG. 8). Then, the first gear ratio it becomes "∞ (infinity)".

In this manner, in a state where the rotation radius r1 is held (a state where the eccentric portion 51b and the pinion 53 rotate synchronously), a rotation cycle of the input shaft 51, and rocking cycles of the rocking portion 42 and the outer ring 62 are synchronized with each other (except in the case where the rotation radius r1 is zero), regardless of the size of the rotation radius r1.

That is, in the present embodiment, by the rocking conversion rod 40, the rotation radius variation mechanism 50, and the one-way clutch 60, a four-node link mechanism is configured with four nodes of the central axis O1, the first fulcrum O3, the second fulcrum O4, and the central axis O2, as rotation points. Then, by the rotary motion of the first fulcrum O3 about the central axis O1, the second fulcrum O4 is adapted to make the rocking motion about the central axis O2 as a rocking axis. Further, by varying the rotation radius r1 by the rotation radius variation mechanism 50, the rocking angle θ2 and the angular velocity ω2 of the second fulcrum O4 are varied.

<Third Shaft—Others>

Descriptions will be continued referring back to FIG. 1. A gear 83a is secured to the third shaft 83, and meshed with a ring gear 112 described later. Therefore, the third shaft 83 is adapted to rotate integrally with driving wheels 115L, 115R.

Further, a rotational speed sensor 83d is attached to the third shaft 83. The rotational speed sensor 83d is adapted to detect a rotational speed R83 (rpm) of the third shaft 83, and to output it to the ECU 200.

<Fourth Shaft, Second Clutch>

The fourth shaft 84 is connected to the third shaft 83 via the second clutch 92. Further, a gear 84a is secured to the fourth shaft 84.

Similar to the first clutch 91, the second clutch 92 is intended to connect (turn ON)/disconnect (turn OFF) a power transmission between the third shaft 83 and the fourth shaft 84 according to the instructions from the ECU 200.

<Second Transmission>

The second transmission 70 is provided between the gear 84a secured to the fourth shaft 84 and the gear 82b secured to the second shaft 82, and is a device which shifts a power of the second shaft 82 or the fourth shaft 84, and transmits the shifted power to the other shaft, according to the instruction from the ECU 200. As such a second transmission 70, a stepped transmission which shifts the gear ratio in stages, or a continuous variable transmission (CVT) which shifts the gear ratio continuously, can be used. A second gear ratio i2 of the second transmission 70 is given by "(the rotational speed R82 of the second shaft 82)/(the rotational speed R84 of the fourth shaft 84)". Note that, in a state where the second clutch 92 is turned ON (connected), the rotational speed R84 of the fourth shaft 84 becomes equal to the rotational speed R83 of the third shaft 83.

Here, in the present embodiment, a bypass route that transmits the power of the third shaft 83 to the second shaft 82 by bypassing the first transmission 30 and the one-way clutch 60 is configured to include the fourth shaft 84, the gear 84a, and the gear 82b. Then, the second clutch 92 is provided on the bypass route, and includes a function to connect (turn ON)/disconnect (turn OFF) the power transmission via the bypass route. Further, the second transmission 70 is provided on the bypass route, and includes a function to shift the power via the bypass route.

Here, when driving the hybrid vehicle backward, it is not possible to transmit the power of the second shaft 82 rotating backward to the third shaft 83 via the one-way clutch 60, but it is possible to transmit the power of the second shaft 82 to the third shaft 83 via the bypass route composed of the second transmission 70, the fourth shaft 84, and the like, and to rotate the third shaft 83 backward.

<Differential Gears>

The ring gear 112 is secured to a differential case 111 of the differential gears 110, and meshed with the gear 83a secured to the third shaft 83. Then, differential gears 113 composed of a pinion gear and side gears are connected to the left and right driving wheels 115L, 115R respectively via the left and right driving shafts 114L, 114R. As a result, the driving wheels 115L, 115R are adapted to rotate substantially integrated with the third shaft 83 (foot shaft).

<Battery>

The battery 121 is, for example, a power storage device of a lithium ion type which is configured to be chargeable and dischargeable. The battery 121 is adapted to supply and receive the power to and from the motor generator 20, and to supply the power to the DC motor 54.

A SOC sensor 122 is attached to the battery 121. Then, the SOC sensor 122 is adapted to detect a SOC (Stage Of Charge (%), remaining amount) of the battery 121 and to output the detected SOC to the ECU 200.

<Other Sensors>

An accelerator opening degree sensor 131 is adapted to detect an accelerator opening degree of an accelerator pedal (not shown) and to output the detected accelerator opening degree to the ECU 200. A vehicle speed sensor 132 is adapted to detect a vehicle speed and to output the detected vehicle speed to the ECU 200.

<ECU>

The ECU 200 is a control device for electronically controlling the drive system 1, and is configured to include a CPU, a ROM, a RAM, various interfaces, electronic circuits, and the like, and is further adapted to exert various functions and control various devices according to programs stored therein.

<ECU—Driving Mode Control Function>

The ECU 200 has a function for selecting one of an EV driving mode, an engine driving mode, and a parallel driving mode, and for controlling the drive system 1 according to the selected mode. Here, the EV driving mode is a mode in which the power source is the motor generator 20, and the engine driving mode is a mode in which the power source is the engine 10, and further the parallel driving mode is a mode in which the power sources are the engine 10 and the motor generator 20.

Specifically, the ECU 200 is set to calculate a requested torque requested by the third shaft 83 by a map search based on the accelerator opening degree and the current rotational speed R83 of the third shaft 83. For example, the ECU 200 is set to select the EV driving mode if "the requested torque≤a first threshold value", to select the engine driving mode if "the first threshold value<the requested torque≤a second threshold value", and to select the parallel driving mode if "the second threshold value<the requested torque".

<ECU—Gear Ratio Control Function>

The ECU 200 has a function for controlling appropriately the first gear ratio i1 of the first transmission 30 and the second gear ratio i2 of the second transmission 70.

<ECU—Clutch Control Function>

The ECU 200 has a function for controlling appropriately ON (connected state)/OFF (disconnected state) of the first clutch 91 and the second clutch 92.

<ECU—Deceleration Driving Determination Function, Regeneration Determination Function>

The ECU 200 has a function for determining whether or not the hybrid vehicle is during deceleration driving. Here, the ECU 200 is set to determine that the vehicle is during deceleration driving if a reduction amount of the requested torque per a predetermined time is more than or equal to a predetermined value. In addition, if the vehicle speed detected by the vehicle speed sensor 132 is reduced, it may be determined that the vehicle is during deceleration driving.

In a case where the ECU 200 determines that the hybrid vehicle is during deceleration driving, the ECU 200 has a function for determining whether or not the regenerative power can be generated by making the motor generator 20 function as the generator. Here, if a current SOC of the battery 121 detected by the SOC sensor 122 is less than or equal to the predetermined SOC to be determined that the battery is chargeable, it is determined that the regenerative power can be generated.

<Operation and Effect of Drive System>

Next, the operation (controlling method) and effect of the drive system 1 will be described.

<During Normal Driving—Control for Starting Engine during EV driving>

The control for starting the engine 10 during EV driving will be described with reference to FIG. 10. As a premise, the hybrid vehicle is traveling.

In Step S101, the ECU 200 determines whether or not the hybrid vehicle is during EV driving. Here, if the requested torque calculated based on the accelerator opening degree and the like is smaller than or equal to the above first threshold (the requested torque≤the first threshold value), the ECU 200 determines that the vehicle is during EV driving. In addition, if the engine 10 is in a stop state, the motor generator 20 operates as the motor, and the vehicle speed is greater than zero, the ECU 200 may determine that the vehicle is during EV driving.

If the ECU 200 determines that the vehicle is currently in EV driving ("Yes" in Step S101), the process of the ECU 200 proceeds to Step S102. Note that, in the case of EV driving, the first clutch 91 and the second clutch 92 are OFF (disconnected), and the power of the motor generator 20 is transmitted to the third shaft 83 via the second shaft 82 and the first transmission 30. Then, the ECU 200 appropriately varies the first gear ratio i1 of the first transmission 30, for example, so that the rotation efficiency of the motor generator 20 becomes high. On the other hand, if the ECU 200 determines that the vehicle is not currently during EV driving ("No" in Step S101), the process of the ECU 200 returns to START through RETURN.

In Step S102, the ECU 200 determines whether or not it is necessary to start the engine 10. Here, if the requested torque calculated based on the accelerator opening degree or the like is larger than the above first threshold (the first threshold value<the requested torque), the ECU 200 determines that it is necessary to start the engine 10.

If the ECU 200 determines it is necessary to start the engine 10 ("Yes" in Step S102), the process of the ECU 200 proceeds to Step S103. On the other hand, if the ECU 200 determines it is not necessary to start the engine 10 ("No" in Step S102), the process of the ECU 200 proceeds to RETURN.

In Step S103, the ECU 200 detects the rotational speed R82 of the second shaft 82 by the rotational speed sensor 82*d*. The ECU 200 also detects the rotational speed R83 of the third shaft 83 by the rotational speed sensor 83*d*. In addition, the ECU 200 may calculate the rotational speed R82 of the second shaft 82 based on an instruction voltage to the motor generator 20, and a gear ratio of the gear 21 and the gear 82*a*.

In Step S104, the ECU 200 calculates the first gear ratio i1 where the one-way clutch 60 is in an unlocked state (a free state) based on the rotational speed R82 and the rotational speed R83. In other words, the ECU 200 calculates the first gear ratio i1 so that the forward rocking speed of the outer ring 62 becomes less than the rotational speed R83 of the third shaft 83 (inner ring 61).

In Step S105, the ECU 200 changes the first gear ratio i1 to the value calculated in Step S104. Specifically, the ECU 200 changes the rotation radius r1 of the rotation ring 41 by controlling the DC motor 54 and relatively rotating the eccentric portion 51*b* and the disk 52 so that the first gear ratio i1 becomes the value calculated in Step S104.

In Step S106, the ECU 200 turns the first clutch 91 ON (connected state). Then, the power of the second shaft 82 rotated by the motor generator 20 is transmitted to the unillustrated crankshaft (output shaft) of the engine 10 via the first shaft 81, and the crankshaft begins to rotate, to start cranking.

In Step S107, the ECU 200 starts the control for starting the engine 10, i.e., initiates the combustion cycle in the engine 10. Specifically, the ECU 200 detects a crank angle by a crank sensor (not shown), injects the fuel by controlling the fuel injector (not shown) based on the crank angle, and activates the ignition plug (not shown) at a predetermined timing.

In this case, in association with the start of the combustion cycle in the engine 10, the torque of the second shaft 82 inputted to the first transmission 30 fluctuates slightly, however, the first gear ratio i1 has been changed so that the one-way clutch 60 is in the unlocked state. Therefore, the torque fluctuation of the second shaft 82 is not transmitted to the third shaft 83, and the shock to the third shaft 83 (foot shaft) is reduced. Consequently, the first gear ratio i1 is preferably set in consideration of the torque fluctuation of the second shaft 82 associated with the start of the engine 10.

In Step S108, the ECU 200 determines whether or not the start of the engine 10 is completed. It is determined that the start of the engine 10 is completed, for example, if the crankshaft rotates properly in conjunction with the fuel injection control and the ignition control, or if a predetermined time, by which it is determined that the start is completed, has elapsed since the start of the control for starting the engine 10 in Step S107.

If the ECU 200 determines that the start of the engine 10 is completed ("Yes" in Step S108), the process of the ECU 200 proceeds to Step S109. On the other hand, if the ECU 200 determines that the start of the engine 10 is not completed ("No" in Step S108), the ECU 200 repeats the determination in Step S108.

In Step S109, the ECU 200 normally controls the first gear ratio i1 of the first transmission 30. That the ECU 200 normally controls the first gear ratio i1 means that the ECU 200 calculates the requested torque based on the accelerator opening degree and the rotational speed R83 of the third shaft 83 (and/or the vehicle speed), and based on a map of the requested torque and a basic specific fuel consumption (BSFC), calculates the first gear ratio i1 where the engine 10 operates in a range of small BSFC, and further controls the first transmission 30 according to the first gear ratio i1.

If the process of the ECU 200 proceeds to Step S109 in this manner, both of the engine 10 and the motor generator 20 (functioning as the motor) operate, and the hybrid vehicle travels in the parallel driving, however, the motor generator 20 may be stopped appropriately.

Thereafter, the process of the ECU 200 returns to START through RETURN.

<During Deceleration Driving—Regenerative Power Control/Engine Brake Control>

Figure 11:
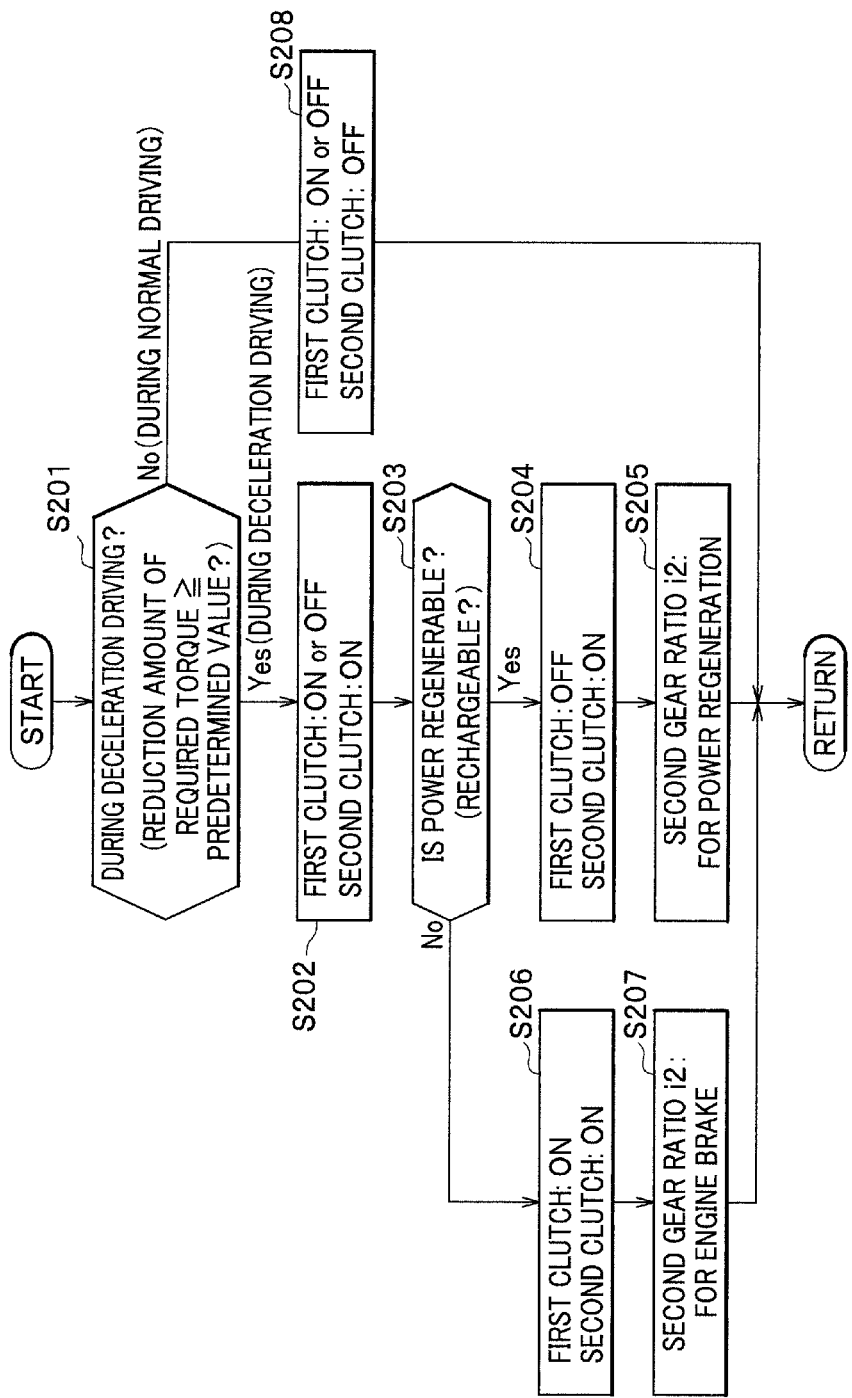
FIG. 11 is a flowchart showing an operation of the drive system according to the embodiment of the present invention.

The regenerative power control and the engine brake control during deceleration driving will be described with reference to FIG. 11. As a premise, the hybrid vehicle is traveling by the engine 10 and/or the motor generator 20 (functioning as the motor) as the power sources.

In Step S201, the ECU 200 determines whether or not the hybrid vehicle is during deceleration driving. Specifically, the ECU 200 determines that the vehicle is during deceleration driving if a reduction amount of the requested torque is more than or equal to a predetermined value.

If the ECU 200 determined that the vehicle is during deceleration driving ("Yes" in Step S201), the process of the ECU 200 proceeds to Step S202. On the other hand, if the ECU 200 determined that the vehicle is not during deceleration driving ("No" in Step S201), i.e., if the ECU 200 determined that the vehicle is during normal driving, the process of the ECU 200 proceeds to Step 5208.

<During Normal Driving>

In Step S208, the ECU 200 maintains a current status (ON or OFF) of the first clutch 91, and turns the second clutch 92 OFF. That is, if the vehicle is during EV driving by only the motor generator 20 (functioning as the motor) as the power source, the first clutch 91 is turned OFF (disconnected state). As a result, the engine 10 in the stop state is prevented from being dragged.

If the vehicle is during engine driving by only the engine 10 as the power source, or if the vehicle is during parallel driving by the engine 10 and the motor generator 20 (functioning as the motor) as the power sources, the first clutch 91 is turned ON (connected state). Thereafter, the process of the ECU 200 returns to START through RETURN.

<During Deceleration Driving>

In Step S202, the ECU 200 turns the second clutch 92 ON (connected state). Note that, the ECU 200 maintains the current status (ON or OFF) of the first clutch 91.

In Step S203, the ECU 200 determines whether or not the power is regenerable, i.e., the regenerative power can be generated by making the motor generator 20 function as the generator.

If the ECU 200 determined that the power can be regenerative ("Yes" in Step S203), the process of the ECU 200 proceeds to Step S204. On the other hand, if the ECU 200 determined that the power cannot be regenerative ("No" in Step S203), the process of the ECU 200 proceeds to Step S206.

<During Deceleration Driving—Regenerative Power Generation>

In Step S204, the ECU 200 turns the first clutch 91 OFF (disconnected state). However, if the first clutch 91 is currently ON, it may be configured to stay ON. In this case, the engine brake is also used while generating the regenerative power.

In Step S205, the ECU 200 shifts the second gear ratio i2 of the second transmission 70 for the power regeneration. The second gear ratio i2 for the power regeneration is calculated based on the rotational speed R83 of the fourth shaft 84 (third shaft 83), the gear ratio of the gear 82a and the gear 21, or the like, so that a rotor of the motor generator 20 functioning as the generator rotates at the rotational speed of high power generation efficiency for the power regeneration. The rotational speed of high power generation efficiency for the power regeneration is a fixed value determined by specifications of the motor generator 20.

Then, the power of the fourth shaft 84 (third shaft 83) is shifted to the second gear ratio i2 for the power regeneration by the second transmission 70 and inputted to the second shaft 82, and the second shaft 82 and the motor generator 20 rotates. The regenerative power generated by the motor generator 20 is charged to the battery 121. In this manner, the regenerative power is charged to the battery 121, and it is possible to bring the battery 121 close to a fully charged state. As a result, a cruising distance by the EV driving is not reduced by the lack of the SOC of the battery 121, and it is possible to improve fuel efficiency of the hybrid vehicle.

Here, the ECU 200 increases the first gear ratio i1 of the first transmission 30 based on the rotational speed R82 of the second shaft 82 and the rotational speed R83 of the third shaft 83, so that the one-way clutch 60 does not become in the locked state (power running state), i.e., so that the one-way clutch 60 becomes in the unlocked state. Incidentally, in this regard, the same is true during execution of the process in Step S207.

Thereafter, the process of the ECU 200 returns to START through RETURN.

<During Deceleration Driving—Engine Brake>

In Step S206, the ECU 200 turns the first clutch 91 ON (connected state).

In Step S207, the ECU 200 shifts the second gear ratio i2 of the second transmission 70 for the engine brake. Specifically, the ECU 200 calculates the extent of the deceleration based on the variation amount of the vehicle speed and the variation amount of the accelerator opening degree, and shifts the second gear ratio i2 so that the engine brake by the engine 10 increases as the extent of the deceleration increases.

Note that, if the process proceeds to Step S207 in this manner, it is not possible to charge the regenerative power ("No" in Step S203). Therefore, the ECU 200 executes the zero torque control so that the regenerative power is not generated by the motor generator 20. In other words, the ECU 200 matches the rotational speed of the rotor of the motor generator 20 rotating in conjunction with the second shaft 82, with the rotational speed of the rotating magnetic field generated by controlling the energization of a U-phase coil, a V-phase coil, and a W-phase coil which constitute the motor generator 20.

Thereafter, the process of the ECU 200 returns to START through RETURN.

MODIFIED EXAMPLE

Although one embodiment according to the present invention has been described above, the present invention is not limited to this, and for example, can be modified as follows.

Figure 10:
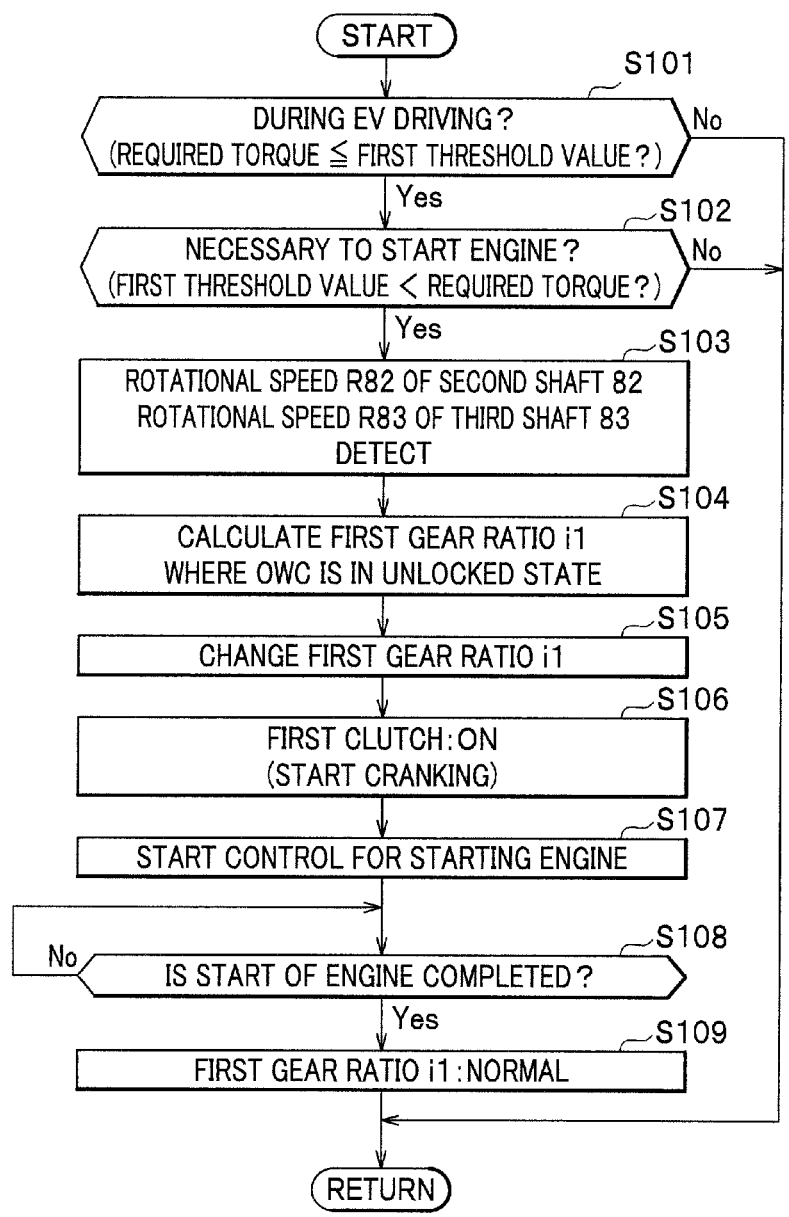
FIG. 10 is a flowchart showing an operation of the drive system according to the embodiment of the present invention.

In the above embodiment, at the start of the engine 10 during EV driving, the processes in Steps S103, S104, and S105 in FIG. 10 are executed, however, it may be configured that the processes are omitted.

Figure 12:
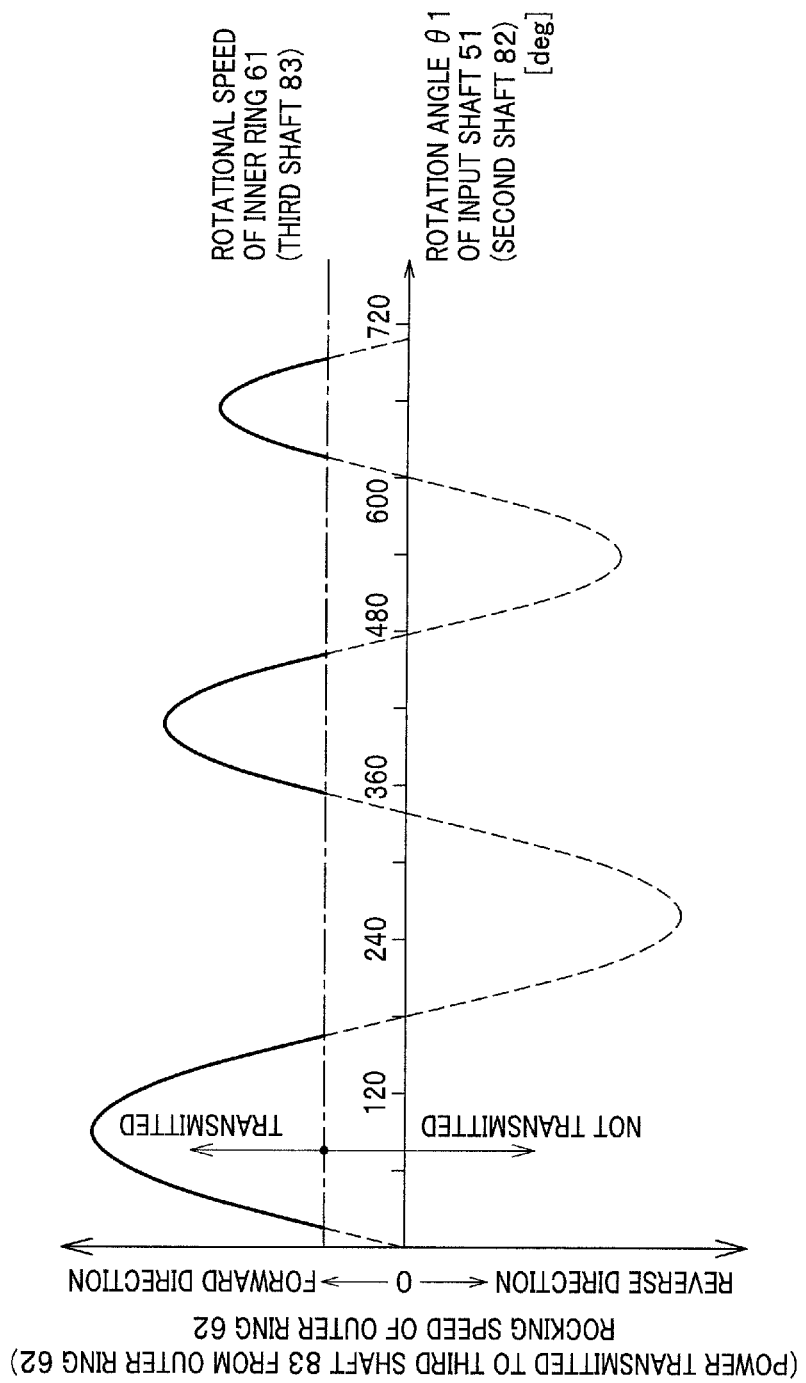
FIG. 12 is a time chart showing an effect of a drive system according to a modified example.

In such a configuration, at the start of the engine 10 during EV driving, the first gear ratio i1 normally varies based on the requested torque or the like, however as shown in FIG. 12, in a region where the forward rocking speed of the outer ring 62 is less than the forward rotational speed of the inner ring 61 (third shaft 83), the one-way clutch 60 becomes in the unlocked state. In other words, in a region where the torque is less than an engagement torque of the one-way clutch 60 (a torque locking the one-way clutch 60), the torque variation of the second shaft 82 associated with the start of the engine 10 is not transmitted to the third shaft 83, thereby reducing the shock to the third shaft 83. Note that, the configuration in which Steps S103 to S105 are omitted is employed, for example, when a sport mode is selected while the drive system 1 includes a mode selection switch (not shown).

In the above embodiment, although the rotation radius variation mechanism 50 includes the eccentric portion 51*b*, the disk 52, and the pinion 53, it is not limited thereto. It may be, for example, configured that a disk which rotates synchronously coaxially with the input shaft 51 is provided, and by a slide groove or the like which extends to a radial direction of the disk, the first fulcrum O3 (see FIG. 3) is slidable in the radial direction, and further the rotation radius r1 is variable by sliding the first fulcrum O3 in the radial direction by an actuator.

In the above embodiment, the rotation radius r1 of the first fulcrum O3 is configured to be variable (see FIG. 3), however instead of or in addition to this, it may be configured that, by sliding the second fulcrum O4 in the radial direction by the actuator, the rocking radius r2 is variable, and the angular velocity ω2 and the rocking angle θ2 are variable. Further, it may be configured that the rocking conversion rod 40 is extendable, and the angular velocity ω2 and the rocking angle θ2 are variable by varying the distance between the first fulcrum O3 and the second fulcrum O4 by the actuator.

In the above embodiment, a configuration in which the engine 10 (internal combustion engine) is a reciprocating engine is exemplified, however in addition to this, it may be a rotary engine, a gas turbine engine, or the like, or the combination of these.

In the above embodiment, a configuration in which the engine 10 is a gasoline engine burning gasoline is exemplified, however in addition to this, it may be a diesel engine burning light diesel oil, a hydrogen engine burning hydrogen, or the like, or the combination of these.

REFERENCE SIGNS LIST

1: drive system
10: engine (internal combustion engine)
20: motor generator
30: first transmission
40: rocking conversion rod
41: rotation ring (rotation portion)
42: rocking portion
50: rotation radius variation mechanism
60: one-way clutch
70: second transmission
81: first shaft
82: second shaft
83: third shaft
84: fourth shaft (bypass route)
91: first clutch (first connecting/disconnecting unit)
92: second clutch (second connecting/disconnecting unit)
115L, 115R: driving wheel
200: ECU (control unit)
R82: rotational speed of second shaft
R83: rotational speed of third shaft
i1: first gear ratio of first transmission
i2: second gear ratio of second transmission

The invention claimed is:

1. A drive system mounted on a hybrid vehicle, comprising:
an internal combustion engine;
a first shaft connected to an output shaft of the internal combustion engine;
a second shaft;
a first connecting/disconnecting unit that connects or disconnects a power transmission between the first shaft and the second shaft;
a motor generator that drives the second shaft;
a third shaft that functionally rotates with drive wheels;
a first transmission that shifts a power of the second shaft;
a one-way clutch that transmits the power after shifted by the first transmission to the third shaft; and
a control unit that controls a gear ratio of the first transmission and the first connecting/disconnecting unit, wherein
the first transmission comprises:
a rotating part that rotates by a rotary motion of the second shaft;
a rocking portion that rocks by a rotary motion of the rotating part; and
a rotation radius variation mechanism that varies an angular velocity of the rocking portion and the gear ratio by varying a rotation radius of the rotating part, wherein
the one-way clutch transmits a power in only one direction of the rocking portion to the third shaft if the angular velocity of the rocking portion is more than or equal to a rotational speed of the third shaft, and wherein
the control unit disconnects the first connecting/disconnecting unit during EV driving, and connects the first connecting/disconnecting unit when the internal combustion engine is started during EV driving.

2. The drive system as set forth in claim 1, wherein when the internal combustion engine is started during EV driving, the control unit controls the gear ratio of the first transmission so that the angular velocity of the rocking portion is less than the rotational speed of the third shaft.

3. The drive system as set forth in claim 1, further comprising:
a bypass route that transmits a power of the third shaft to the second shaft by bypassing the first transmission and the one-way clutch; and
a second connecting/disconnecting unit that connects or disconnects a power transmission via the bypass route, wherein
the control unit disconnects the second connecting/disconnecting unit during normal driving, and connects the second connecting/disconnecting unit during deceleration driving.

4. The drive system as set forth in claim 3, further comprising a second transmission that shifts a power transmitted via the bypass route.

5. A method for controlling a drive system comprising:
providing a drive system, said drive system comprising:
an internal combustion engine;
a first shaft connected to an output shaft of the internal combustion engine;
a second shaft;
a first connecting/disconnecting unit that connects or disconnects a power transmission between the first shaft and the second shaft;
a motor generator that drives the second shaft;
a third shaft that functionally rotates with drive wheels;
a first transmission that shifts a power of the second shaft;
a one-way clutch that transmits the power after shifted by the first transmission to the third shaft; and
a control unit that controls a gear ratio of the first transmission and the first connecting/disconnecting unit, wherein
the first transmission comprises:
a rotating part that rotates by a rotary motion of the second shaft;

a rocking portion that rocks by a rotary motion of the rotating part; and a rotation radius variation mechanism that varies an angular velocity of the rocking portion and the gear ratio by varying a rotation radius of the rotating part, wherein the one-way clutch transmits a power in only one direction of the rocking portion to the third shaft if the angular velocity of the rocking portion is more than or equal to a rotational speed of the third shaft, and wherein the control unit disconnects the first connecting/disconnecting unit during EV driving, and connects the first connecting/disconnecting unit when the internal combustion engine is started during EV driving.

6. The method for controlling the drive system, as set forth in claim 5, wherein when the internal combustion engine is started during EV driving, the control unit controls the gear ratio of the first transmission so that the angular velocity of the rocking portion is less than the rotational speed of the third shaft.

7. The method for controlling the drive system, as set forth in claim 5, the drive system further comprising:

a bypass route that transmits a power of the third shaft to the second shaft by bypassing the first transmission and the one-way clutch; and a second connecting/disconnecting unit that connects or disconnects a power transmission via the bypass route, wherein the control unit disconnects the second connecting/disconnecting unit during normal driving, and connects the second connecting/disconnecting unit during deceleration driving.

8. The drive system as set forth in claim 2, further comprising:

a bypass route that transmits a power of the third shaft to the second shaft by bypassing the first transmission and the one-way clutch; and a second connecting/disconnecting unit that connects or disconnects a power transmission via the bypass route, wherein the control unit disconnects the second connecting/disconnecting unit during normal driving, and connects the second connecting/disconnecting unit during deceleration driving.

9. The drive system as set forth in claim 8, further comprising a second transmission that shifts a power transmitted via the bypass route.

10. The method for controlling the drive system, as set forth in claim 6, the drive system further comprising:

a bypass route that transmits a power of the third shaft to the second shaft by bypassing the first transmission and the one-way clutch; and a second connecting/disconnecting unit that connects or disconnects a power transmission via the bypass route, wherein the control unit disconnects the second connecting/disconnecting unit during normal driving, and connects the second connecting/disconnecting unit during deceleration driving.

* * * * *